INVENTORS:
Richard H. Jensen
Arnold B. Nordstrom

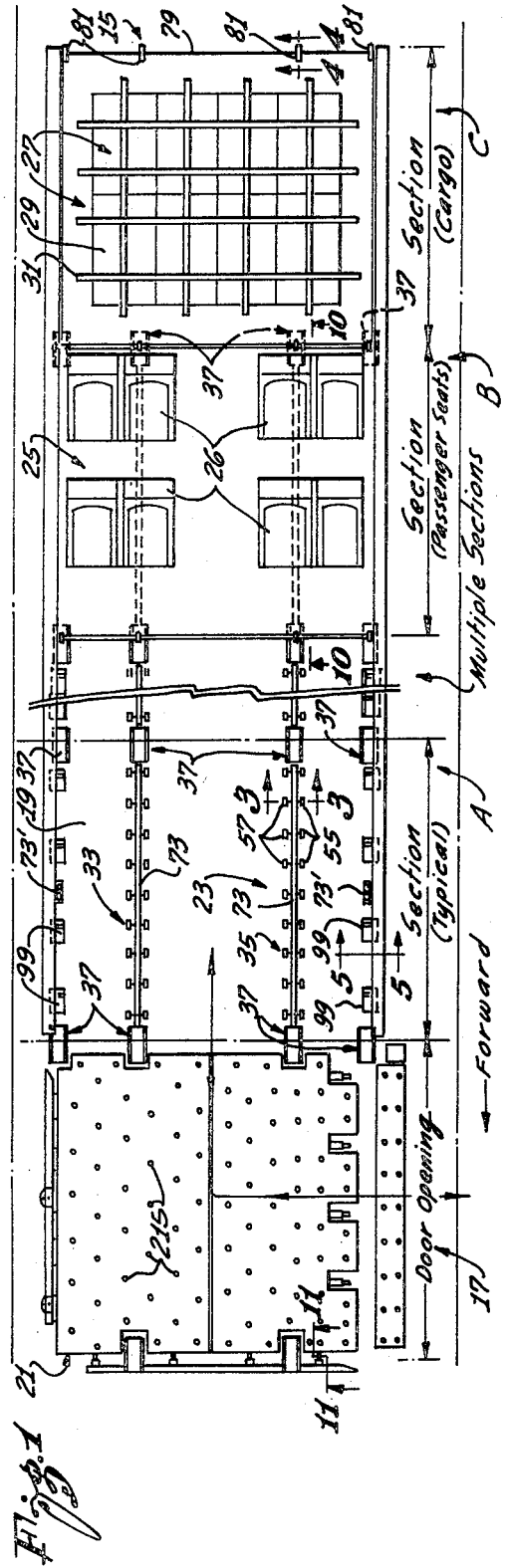

ATTORNEYS

Nov. 25, 1969     R. H. JENSEN ET AL     3,480,239
QUICK CHANGE SYSTEM
Filed Feb. 23, 1967     5 Sheets-Sheet 3
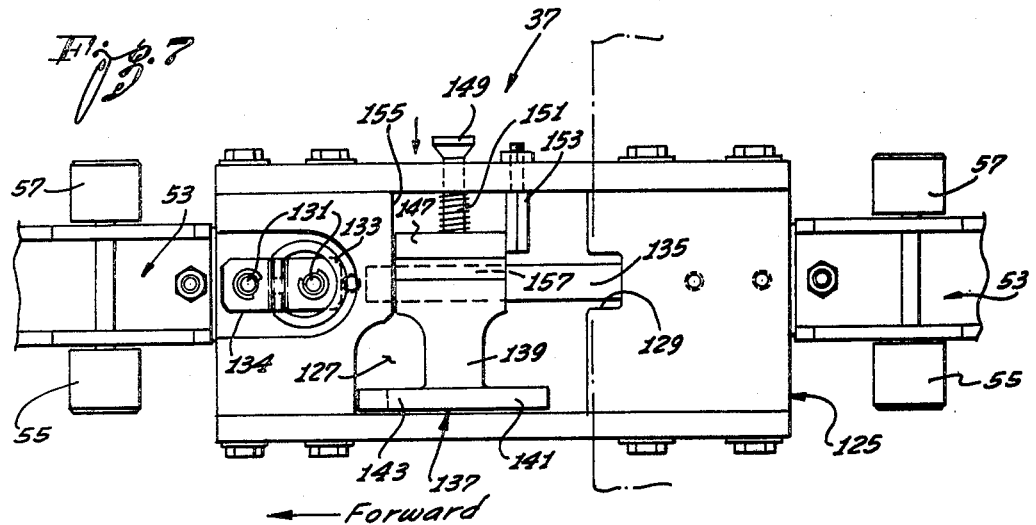
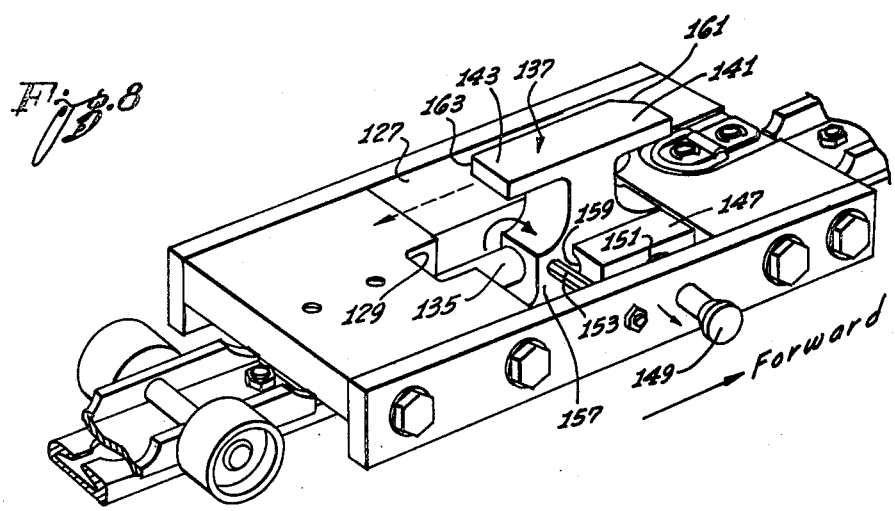
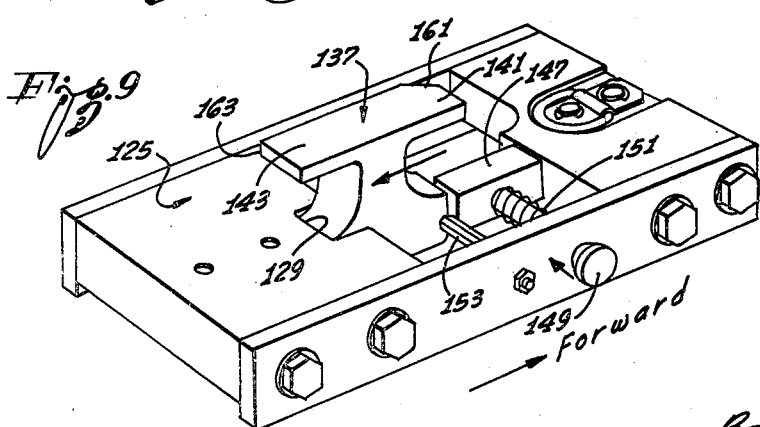
INVENTORS:
Richard H. Jensen
Arnold E. Nordstrom
ATTORNEYS

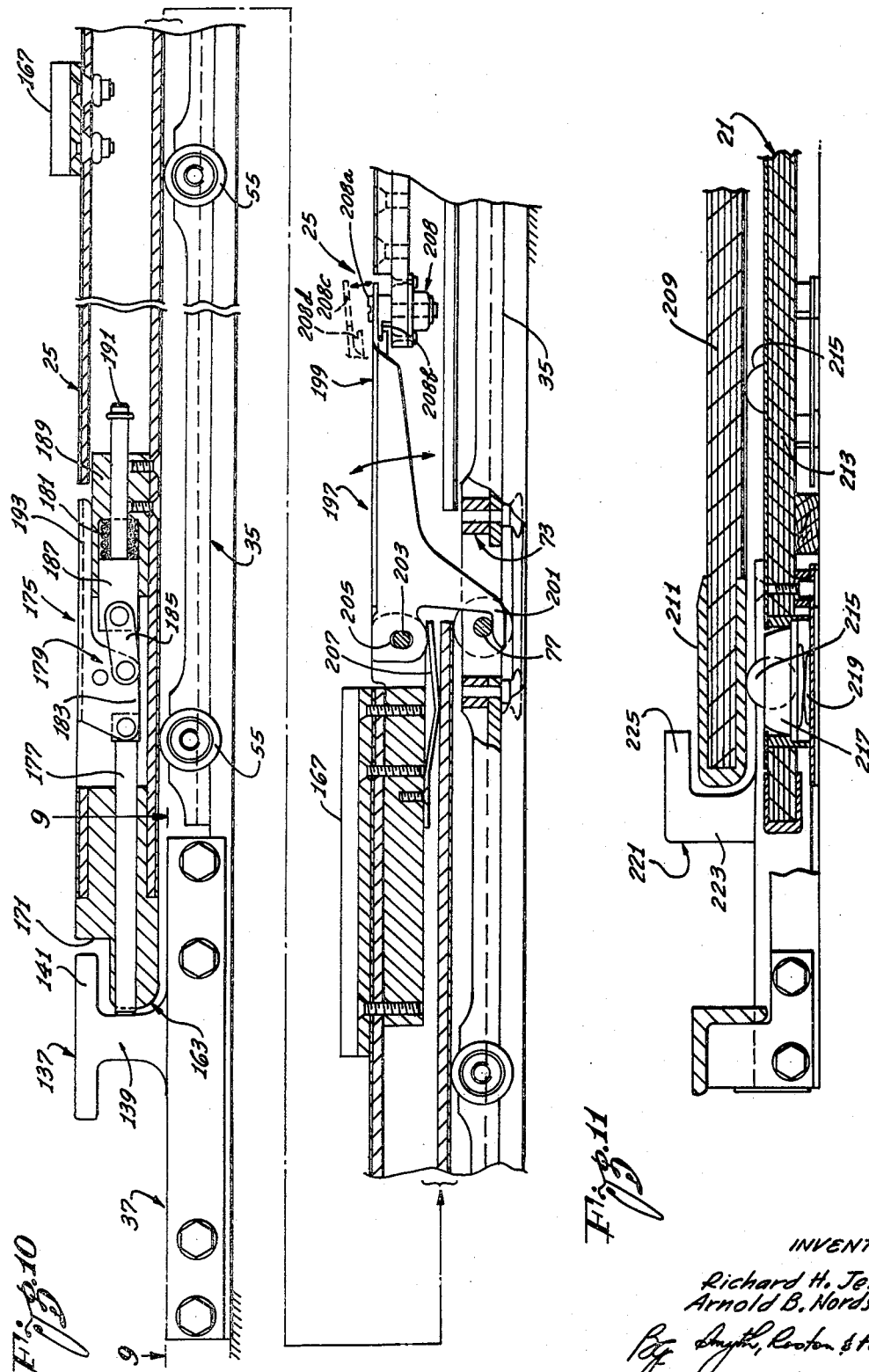

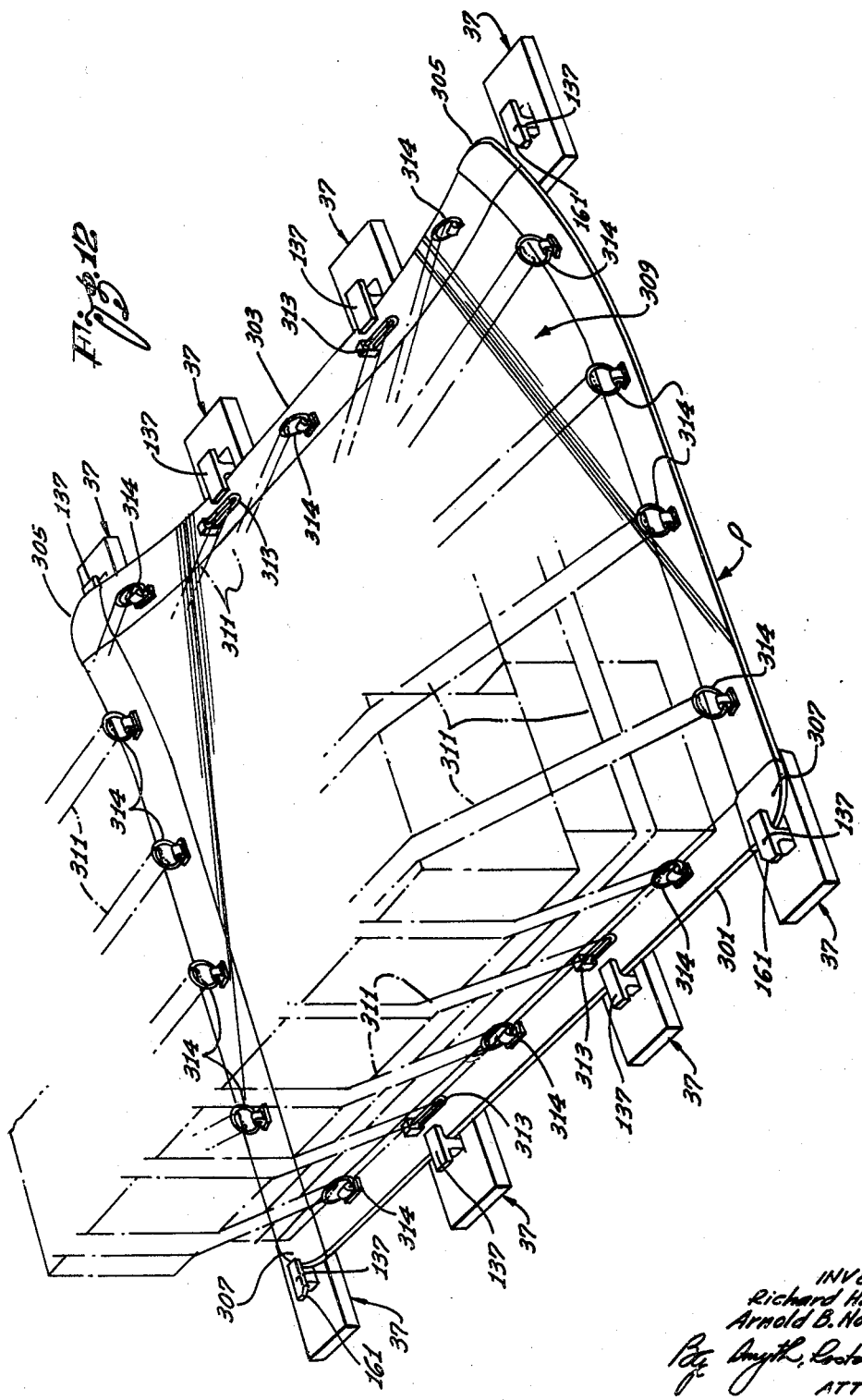

United States Patent Office 3,480,239
Patented Nov. 25, 1969

3,480,239
QUICK CHANGE SYSTEM
Richard H. Jensen, Los Angeles, and Arnold B. Nordstrom, Torrance, Calif., assignors, by mesne assignments, to Tridair Industries, Redondo Beach, Calif.
Filed Feb. 23, 1967, Ser. No. 617,947
Int. Cl. B64d 9/00, 11/06
U.S. Cl. 244—118
33 Claims

ABSTRACT OF THE DISCLOSURE

The disclosure of this invention describes an improved quick change system which is particularly adapted for use in aircraft. The quick change system as described herein includes a plurality of tracks and other rollers which are detachably mounted to seat rails or other suitable devices which are permanently installed in the aircraft. The tracks and rollers support either passenger or cargo pallets and a series of latching assemblies are utilized to secure the pallets in position within the aircraft. The seat pallet described herein includes a tie-down mechanism and an antirattle device for tightly securing the seat pallet in position within the aircraft and for preventing annoying rattling thereof.

BACKGROUND OF THE INVENTION

This invention relates to a quick change system for vehicles and more particularly to a quick change system for permitting rapid installation and removal of load supporting members or pallets in a vehicle. The present invention is usable with vehicles of all types, but is particularly adapted for use in aircraft.

When aircraft are used to transport cargo it is desirable that the load be containerized or palletized to facilitate rapid loading and removal of the cargo from the airplane. When the cargo is in the aircraft it is very important that the pallet be securely fastened to the floor structure of the airplane to prevent shifting of the load and consequent damage to the aircraft, its crew, and to the cargo therein during normal flight conditions, including in flight gust loading for vertical, down, and side conditions, as well as adverse landing conditions and otherwise survival crash conditions.

It is often necessary or desirable to use some aircraft for both cargo and passenger service. Of course, when the airplane is being used for transporting cargo, it is desirable to have a major portion of the floor of the airplane open to receive the cargo. In converting an airplane from cargo to passenger service, it is necessary to install seats on the floor area which had heretofore been used for cargo. Prior art convertible aircraft of this type have a major drawback in that considerable time is required to convert the airplane from cargo to passenger service. One of the primary reasons for this is that portions of the pallet supporting structure of the aircraft have to be removed to allow installation of the seats. The seats are then installed individually and this requires additional time. This wasted time is paticularly significant when the particular aircraft must be frequently converted between passenger and cargo service. Of course, a similar large amount of time is used when converting passenger service back to cargo service.

SUMMARY OF THE INVENTION

According to the present invention, aircraft can be more rapidly changed from cargo to passenger service and vice versa. This is accomplished, in part, by palletizing the passenger seats, utilizing a pallet supporting structure which will receive either or both cargo pallets and seat pallets, and by providing a rapidly-extendible and retractable member or latch mechanism in the seat pallets. Both cargo pallets and seat pallets can be rapidly installed and removed from the aircraft, thereby permitting rapid changeover. This feature also allows rapid loading and unloading of palletized cargo from the aircraft. Thus, with the present invention, the cargo pallets are simply removed from the pallet supporting structure of the vehicle and the seat pallets are installed on the very same floor structure.

It is very important that the pallets be securely fastened in the vehicle. In the case of a loose cargo pallet, damage to the cargo or to the aircraft, or injury to the airplane crew, may result therefrom. In the case of seat pallets, it is desirable that the pallet not rattle, for the resultant noise would be an annoyance to the passengers. The present invention provides securing means which tightly hold the pallet to the pallet supporting structure of the vehicle. The seat pallets are provided with antirattle devices which prevent annoying rattling sounds when the plane is subjected to vibration.

The present invention employs a plurality of tracks having rollers thereon over which the seat and/or cargo pallets may be easily rolled into position. The pallets are held in selected positions along the tracks, in part, by several latching means or assemblies, each of which has a latching member that is engageable with a transverse end of the pallet. One advantageous feature of this invention is that each of the latching members is readily movable to a retracted position so that the pallets can be moved thereover without interference therefrom. Each of the latching members is a unitary member and when moved to the locking position can be utilized simultaneously to restrain two adjacent pallets. Prior art latching members of this general type have only been operative to restrain a single pallet. The retractable latching means disclosed by the prior art to secure adjacent pallets have been extremely costly structures with interlocking latchable parts to perform the locking function. The latch invention here described may be embodied in a latch which includes a simple solid T member rotatable about a strength-carrying axis to its engaged position below the top of the roller means.

More particularly, some of the concepts of the present invention may include a plurality of tracks extending longitudinally along the floor structure of the vehicle and supportable thereby. Each of the tracks includes at least one longitudinally extending member having several pairs of rollers secured thereto. The tracks are mounted on the floor structure to permit slight rocking movement thereof. Accordingly, the rollers or bearing portions of the tracks are similarly capable of slight rocking movement about a generally longitudinally extending axis. It follows that when the rollers are utilized to support a pallet that any bending of the pallet about a longitudinal axis will result in a rocking or tilting of each of the tracks so that substantially the full width of the bearing portions thereof will be continuously utilized to support the pallet. Also, without this rocking capability the relatively sharp corners of the rollers might damage the pallets when the latter are deflected.

To obviate the need for providing additional tracks along the longitudinal edges of the floor structure of the aircraft and to provide additional support for the pallets, a plurality of side guide assemblies are disposed in longitudinally spaced relationship along the longitudinal edges of the floor structure. Generally, each of the side guide assemblies includes a body member which provides a roller supporting section and a lateral guide section extending upwardly from the roller section. A roller is rotatably mounted on the roller mounting section and serves to support the pallets moved thereover and to allow low friction movement of the pallets. The lateral guide section extends upwardly of the roller and outwardly thereof to guide the movement of the pallet as it is moved longitudinally along the pallet supporting structure. The guide assemblies are detachably secured to the supporting floor structure and form a portion of the pallet supporting structure.

Several of the locking assemblies are disposed along the various tracks at preselected intervals. The locking assemblies are spaced longitudinally along each of the tracks a sufficient distance to receive a pallet therebetween. One of the primary purposes of each of the locking assemblies is to at least partially embrace the transverse edge portions of the pallets to restrain longitudinal movement thereof and to also restrain movement of the pallet away from the floor structure of the vehicle. Each of the locking assemblies is provided with an abutment or a latching member for accomplishing this purpose.

To allow free rolling movement of the pallets along the rollers, it is desirable that the latching members of each of the locking assemblies be movable so that they will not interfere with such movement of the pallet during installation and removal thereof from the aircraft. According to the present invention, each of the latching members is pivotable about a longitudinal pivotal axis between a retracted position in which the latching member does not interfere with the movement of the pallet and an elevated position in which the latching member has sufficient height to embrace a portion of the transverse edge of the pallet and to restrain the latter against movement.

Most of the latching members lie intermediate a pair of pallets and are preferably generally T-shaped to allow a single unitary latching member to simultaneously restrain two adjacent pallets. Preferably, the latching member is movable longitudinally when it is in the elevated position thereof to a locking position in which it is engageable with a transverse end of the pallet. It is also desirable to provide means for retaining the latching member in this locking position and to render such means operative automatically in response to movement of the latching member to the locking position. To allow for movement of the latching member to the retracted position, it has been found convenient to provide a recess in the latching assembly into which the latching member is receivable in the retracted position thereof.

The latching members embrace the transverse ends of the pallet. Certain load conditions tend to bend the pallets upwardly in a central region thereof about a transverse axis. When this occurs, the transverse ends of the pallet would be withdrawn from the latching members, thereby freeing the pallet. The present invention solves this problem by allowing the pallet to bend about a longitudinal axis under certain load conditions to form a longitudinally extending channel which presents very substantial resistance to bending about a transverse axis. This is accomplished by shaping the outboard latching members at the rear of each pallet to allow such bending about a longitudinal axis to occur.

It has been found that the locking assemblies alone are sufficient to retain a cargo pallet against an undue amount of movement. However, in the case of a seat pallet it is desirable not only to prevent undue movement of the pallet, but also to prevent rattling thereof and the noise which accompanies forceful contact between metal parts. According to the present invention, an antirattle device is provided which includes an extendible member mounted on the load supporting member or pallet for movement longitudinally thereof. Suitable abutments, preferably the latching members, are provided closely adjacent the transverse ends of the load supporting member and the extendible member is movable longitudinally into engagement with one of these abutments. Biasing means are provided for resiliently urging the extendible member longitudinally into engagement with one of the abutments, thereby permitting the extendible member to resiliently retain the load supporting member between the abutments. It is preferred to utilize toggle lever means for operating the extendible member. The toggle lever can be utilized to selectively permit the biasing means to act on the extendible member to cause retention of the seat pallet and to withdraw the extendible member out of engagement with the abutment and thereby prevent the biasing means from acting thereon. This construction has been found very effective in eliminating noise and vibration.

To further retain the seat pallet against undesirable movement, interengaging means are provided on the seat pallet and the tracks for retaining the seat pallet firmly against the tracks. In particular, each of the tracks preferably includes a longitudinal member having a pin extending generally transversely thereof. Handle means having a latching portion are pivotally mounted on the seat pallet to be pivotable between a locking position in which the locking portion lockingly engages the pin to secure the seat pallet to the track means and a releasing position in which the locking portion is out of locking engagement with the pin. This construction serves to securely lock the seat pallet to the track. Preferably, a spring or other suitable means is provided for biasing the handle member toward the locking position thereof.

With the present invention, the pallet supporting structure, which includes the tracks, the locking assemblies, and various peripheral retainers and rollers which are disposed along the periphery of the vehicle floor is permanently mounted on the floor structure of the aircraft. When it is desired to install a cargo pallet, it is only necessary to load the cargo pallet into the aircraft and push the latter rearwardly along the rollers of the track to the rear of the aircraft. The latching members of the locking assembly thereadjacent are then pivoted to the locking position thereof, whereupon the cargo pallet is firmly locked to the pallet supporting structure. Additional cargo pallets may be similarly installed.

When it is desired to convert the aircraft to a passenger hauling aircraft, the forwardmost latching members are moved to their retracted position to allow removal of the forwardmost cargo pallet. The remaining cargo pallets can be sequentially removed from front to rear in a similar manner. With all of the latching members in the retracted position, a seat pallet may be loaded into the aircraft and pushed rearwardly. The toggle lever is then operated to cause the extendible member to be biased into engagement with the adjacent locking member. The tiedown assembly, i.e., the interengaging means on the track and pallet, are moved to the locking position and the latching members of the adjacent locking assemblies are moved to their locking positions. The seat pallet is thus securely held in position and prevented from rattling. Additional seat pallets and/or cargo pallets may be installed in a similar manner. It is apparent, therefore, that the various seat and cargo pallets may be installed without requiring any change, removal, or additions to the pallet supporting structure of the aircraft.

The invention, both as to its organization and method of operation, together with further features and advantages thereof, may best be understood by reference to the following description taken in connection with the accompanying drawings.

BRIEF DESCRIPTION OF THE DRAWINGS

FIG. 1 is a semidiagrammatic plan view of a portion of an airplane utilizing the present invention.

FIG. 2 is a fragmentary plan view showing one of the tracks and the mounting channel therefor.

FIG. 2a is a fragmentary sectional view taken along line 2a—2a of FIG. 2 with the plunger in the locked position.

FIG. 3 is an enlarged fragmentary sectional view taken along line 3—3 of FIG. 1 and showing how one of the tracks is mounted on the mounting channel.

FIG. 7 is a plan view of one of the locking assemblies and the adjacent portions of floor structure with the latching member in the retracted or releasing position.

FIG. 8 is a perspective view of the locking assembly with the latching member thereof in the intermediate elevated position.

FIG. 9 is a perspective view similar to FIG. 8 with the latching member in the locking position.

FIG. 10 is an enlarged sectional view taken along line 10—10 of FIG. 1 illustrating one of the seat pallets with the seats thereon removed and showing the anti-rattle device and the tiedown mechanism.

FIG. 11 is an enlarged fragmentary sectional view taken along line 11—11 of FIG. 1 showing a detail of construction of the ball mat and showing how the ball mat may be utilized to support a cargo pallet.

FIG. 12 is a semidiagrammatic perspective view illustrating the manner in which the cargo pallet is allowed to bend about a longitudinal axis to substantially prevent bending thereof about a transverse axis.

DESCRIPTION OF THE PREFERRED EMBODIMENT

Figure 4:
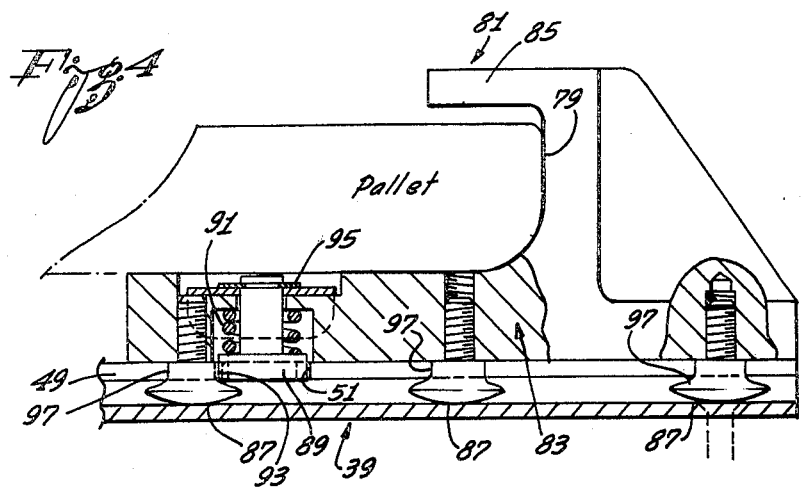
FIG. 4 is an enlarged fragmentary sectional view taken along line 4—4 of FIG. 1 illustrating one of the aft locks.

Referring to the drawings, and in particular to FIG. 1 thereof, reference numeral 15 designates an airplane utilizing the present invention. The airplane 15 has a door opening 17 adjacent the forward end thereof for providing access to the interior of the airplane. The airplane 15 has a floor structure 19 which supports a ball mat 21 adjacent the door opening 17. The airplane 15 has several sections designated A, B, and C, respectively, arranged rearwardly of the ball mat 21. The section A is shown as containing no pallet in order to illustrate a pallet supporting structure 23 of the airplane 15, which is detachably secured to the floor structure 19. The section B is a passenger section and contains a seat pallet 25 having a plurality of passenger seats 26 rigidly secured thereto. The section C is a cargo section and contains a cargo pallet 27 having a load 29 secured thereto by straps 31 which are affixed to the pallet. It should be understood that the airplane may contain; and, in fact, will probably contain more than three sections and that the sections may be arranged in any manner desired.

Generally, the pallet supporting the structure 23 includes a pair of tracks 33 and 35 extending in side-by-side parallel relationship longitudinally through the airplane 15. Each of the tracks 33 and 35 are preferably made up of several longitudinal sections and a locking assembly 37 is provided intermediate adjacent sections of the track. The pallet supporting structure 23 also includes numerous rollers and locking mechanisms distributed around the periphery of the airplane 15 as is described more fully hereinafter.

More particularly, with reference to FIG. 2, each of the tracks 33 and 35 are detachably mounted to the floor structure 19 by a longitudinally extending conventional mounting channel or seat rail 39 which forms part of the floor structure. FIG. 2 illustrates only the track 35 and one mounting channel 39, it being understood that the track 33 is similarly constructed and mounted. The mounting channel 39 extends longitudinally throughout the full length of the sections A, B and C. The mounting channel 39 may be permanently secured to the floor 19 of the airplane by bolts 41 as shown in FIG. 3 or it may be mounted with the upper surface thereof flush with the floor. As shown in FIG. 3, the mounting channel 39 has a base 43 which rests on the floor structure 19 and an interior groove 45 which opens at an upper face 47 thereof. The mounting channel 39 includes a pair of flanges 49 which close a portion of the upper end of the groove 45. As best seen in FIG. 2, the flanges 49 are spaced to form a longitudinal slot 50 and each have arcuate cutout portions 51 disposed oppositely to each other. Many pairs of the cutout portions 51 are disposed in longitudinally spaced relationship along the mounting channel 39.

With further reference to FIGS. 2 and 3, the track 35 includes a central channel portion 53 extending longitudinally along the mounting channel 39. Each of the tracks 35 may include a plurality of the channel portions or track sections 53 and its preferred to provide one channel portion 53 for each of the sections A, B and C. With the arrangement illustrated, the channel portion 53 extends between longitudinally spaced pairs of the locking assemblies 37 as shown in FIGS. 1 and 7.

The track 35 also includes many pairs of rollers 55 and 57 rotatably mounted in longitudinally spaced relationship about transverse axes on the channel portion 53. More particularly, the channel portion 53 includes a base 59 and upright parallel flanges 61. Each pair of the rollers 55 and 57 is mounted on a separate pin 63 which extends transversely through the upright flanges 61 and which transversely aligns the rollers 55 and 57 mounted thereon. Bearings 65 may be provided for mounting the rollers 55 and 57 on the pin 63.

The channel portion 53 has a plurality of depending tongues 67 to fit through the cutout portions 51 and to be retained beneath the flanges 49 upon longitudinal movement of the channel portion 53 relative to the mounting channel 39. The tongues 67 may be integral with the channel portion 53 or secured thereto by nuts 67a (FIG. 2). Such longitudinal movement is permitted by a narrow neck portion 68 of the tongue which is slidable in the slot 50. The tongues 67 are longitudinally spaced to be inserted simultaneously through the various cutout portions 51 of the mounting channel 39.

A plunger 69 (FIGS. 2 and 2a) is mounted on the channel portion 53 and is supported by a leaf spring 70 and biased downwardly by a coil spring 70a. The plunger 69 is of sufficiently large diameter so that when downward movement thereof is permitted it will firmly seat within the cutout portion 51 (FIG. 2a) and prevent longitudinal movement of the central channel portion 53 relative to the mounting channel 39. This assures that the track 35 will be firmly detachably mounted on the mounting channel 39.

The central channel portion 53 has a lower face 71 which confronts the upper face 47 on the mounting channel 39. The upper face 47 and the lower face 71 diverge as they extend transversely outwardly of the tongue 67 as shown in FIG. 3. This divergence allows for a slight rocking or pivoting movement of the entire track 35 relative to the mounting channel 39 about a longitudinal axis. It has been found that a divergence of approximately two degrees between the faces 47 and 71 is desirable. As the mounting channel is a permanent part of the floor structure 19, this divergence is provided by inclining the lower face 71 upwardly as it extends transversely outwardly of the tongue 67.

As shown in FIG. 3, a pallet is supported by the rollers 55 and 57. Thus, these rollers form a supporting bearing surface for the pallet. The pallet, whether it is used for passengers or cargo, will be subjected to loads tending to deflect it about a longitudinal axis. By permitting this slight rocking or pivotal movement of the track 35 about the mounting channel 39, the track will turn slightly under the influence of the load which causes pallet deflection. This assures that substantially the full width of the bearing portion of the rollers 55 and 57 will be operative continuously to support the pallet. Furthermore, if the pallet were to deflect and the rollers 55 and 57 did not pivot a corresponding amount, the pallet might be supported by only a corner of one of the rollers. The corner of the roller, being relatively sharp, would tend to damage the pallet as the latter was rolled or supported by the roller.

Of course, the track 33 is preferably similarly mounted to provide for slight rocking movement about a longitudinally extending axis. Although two of the tracks 33 and 35 are illustrated in FIG. 1, it should be understood that various numbers thereof may be provided, if desired.

With further reference to FIG. 2, it will be seen that the track 35 also includes a block 73 suitably mounted within the central channel 53 intermediate the ends thereof. The block 73 has a slot 75 therein with a pin 77 extending transversely across the slot. The pin 77 is useful to mounting the adjacent rollers 55 and 57 and also in securing the seat pallet 25 to the floor structure 23, as is described more fully hereinbelow. Outboard blocks 73', which are substantially identical to the blocks 73, are directly secured to the mounting channel 39 in transverse alignment with the blocks 73.

In use of the present invention, a pallet is inserted through the door opening 17 onto the ball mat 21. The pallet is then pushed rearwardly along the tracks 33 and 35. The pallet is rolled along the tracks 33 and 35 as permitted by the rollers 55 and 57. The first pallet to be inserted is rolled to the aft end of the airplane 15. To retain a rearward transverse end 79 of the pallet (FIG. 4). a plurality of aft locks 81 are distributed in transversely spaced relationship along the rearward transverse end 79 of the pallet.

As shown in FIG. 4, each of these aft locks 81 includes a body 83 having a U-shaped edge embracing section 85. The edge embracing section 85 embraces a transverse end portion of the pallet as shown in FIG. 4 and prevents rearward and upward movement of the pallet relative to the lock 81.

The lock 81 is detachably mounted in the mounting channel 39 in a similar manner as the track 35. Thus, the aft lock 81 includes lugs 87 of circular cross-section which depend from the body 83. A plunger 89 is mounted in the body 83 for axial movement in a vertical direction and is normally biased downwardly by a coil spring 91 into engagement with a shoulder 93 on the forwardmost lug 87. The plunger 89 may be raised by lifting a tab 95 which is secured to the upper end thereof. The lugs 87 are insertable through the cutout portions 51 (FIG. 2) and are slidable beneath the flanges 49 in the slot 50 as permitted by a reduced diameter portion 97 on each of the lugs. The plunger 89, however, has no reduced diameter portion in engagement with the mounting channel 39, and accordingly, it seats in the cutout portion 51 and cannot slide longitudinally thereof. Thus, the lugs 87 prevent upward movement of the lock 81 and the plunger 89 prevents longitudinal movement thereof.

Figure 5:
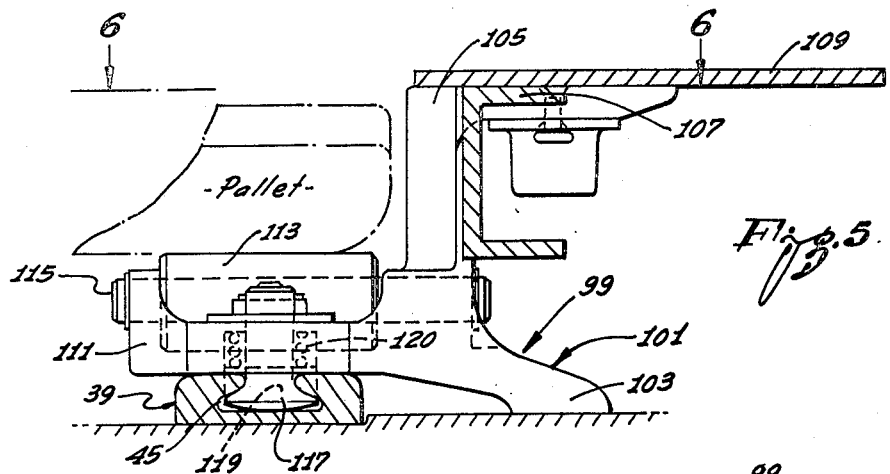
FIG. 5 is an enlarged fragmentary sectional view taken along line 5—5 of FIG. 1 and illustrating one of the side guide assemblies.
Figure 6:
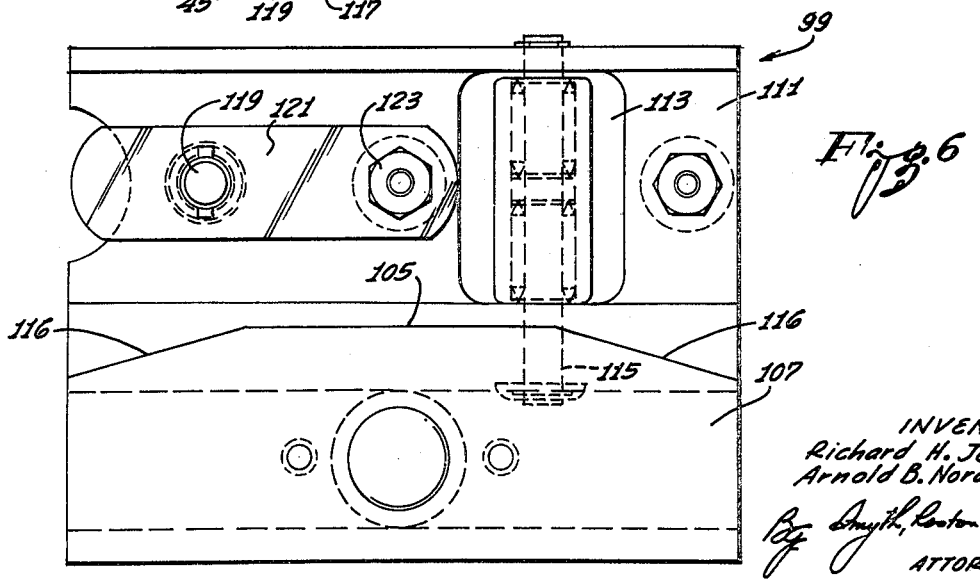
FIG. 6 is a top plan view taken along line 6—6 of FIG. 5.

To facilitate rolling of the pallets within the airplane 15 and to provide additional support therefor, a plurality of side roller assemblies or side guide assemblies 99 are distributed in longitudinally spaced relationship along the opposed longitudinal edges of the floor structure 19 of the airplane 15 (FIG. 1). This eliminates the need for providing tracks such as the tracks 33 and 35 along the longitudinal edges of the floor structure 19. The details of the side guide assembly 99 are shown in FIGS. 5 and 6. Each of the side guide assemblies 99 includes a body portion 101. The body portion 101 has a supporting leg 103, an upwardly and longitudinally extending lateral guide 105 having an inwardly facing guide surface for limiting outward transverse movement of the pallet and for guiding longitudinal pallet movement, and a horizontal flange 107. The flange 107 is detachably secured to a carpet support 109 which extends longitudinally through the airplane 15. The body portion 101 also has a roller mounting section 111 on which a roller 113 is rotatably mounted about a transversely extending axis. A pin 115 extends transversely through the roller mounting section 111 and rotatably mounts the roller 113. As shown in FIG. 5, a longitudinal edge portion of the pallet is supported by the roller 113. The lateral guide 105 has outwardly flared surfaces 116 (FIG. 6).

The side guide assembly 99 is detachably mounted on the mounting channel 39 in the same manner as the aft lock 81. Thus, lugs 117 depend from the body portion 101 and are received within the groove 45 of the mounting channel 39 and a plunger 119, which is similar to the plunger 89, is biased downwardly by a spring 120 to prevent longitudinal movement of the assembly 99 relative to the mounting channel 39. An arm 121 is secured by a bolt 123 to the roller mounting section 111. The arm 121 is secured to the upper end of the plunger 119 so that by moving the arm 121 upwardly the plunger 119 is moved upwardly against the biasing action of the spring 120.

Another important features of this invention is the locking assembly 37. A plurality of the locking assemblies 37 are spaced transversely along each of the transverse edges of the sections A, B and C and are detachably secured to the mounting channel 39. The details of the locking assemblies 37 can best be seen in FIGS. 7–9. Each of the locking assemblies 37 includes a body member 125 having a recess or opening 127 therein. The rearward end of the recess 127 is provided with a notch 129. The locking assembly 37 is detachably secured to the mounting channel 39 in a similar manner as described hereinabove in connection with the aft lock 81. The locking assembly 37 is held in the mounting channel 39 by depending tongues (not shown) and plungers 131 which are movable by a ring 133 and tab 134.

A stub shaft 135 extends longitudinally through the recess 127 and is rigidly mounted to the body member 125. A latching member 137 is pivotally mounted on the stub shaft 135 for movement about a pivotal axis which extends generally longitudinally of the airplane 15. The latching member 137 is a solid unitary metal member which is generally T-shaped. The latching member 137 has a shank portion 139 and a pair of overhanging flanges 141 and 143. The latching member 137 serves as an abutment means or holding means for restraining the edge of an adjacent pallet.

The latching member 137 is pivotable between a retracted or releasing position (FIG. 7) in which the latching member is received within the recess 127 and lies below the uppermost reach of the rollers 55 and 57. The latching member 137 can be pivoted to an intermediate elevated position (FIG. 8) in which it is substantially perpendicular to the plane of the body member 125. The latching member 137 is movable longitudinally on the shaft 135 from a forward position to a rearward or locking position (FIG. 9) in which a lower portion of the latching member is received in the notch 129. The notch embraces a portion of the latching member 137 to maintain the latter in the elevated position.

Means are provided for retaining the latching member in the locking position. Such means may include a detent 147 secured to an actuating rod 149. The actuating rod is mounted for transverse movement on the body member 125 and a coil spring 151 biases the detent 147 and rod 149 toward an inward locking position. Transverse movement of the detent 147 is guided by a pin 153 and an inner surface 155 of the recess 127.

With the latching member 137 in the retracted position thereof (FIG. 7), the latching member 137 can be rotated about the stub shaft 135 to the intermediate elevated position (FIG. 8). During this time, the detent 147 is biased against an arcuate surface 157 of the latching member 137 by the spring 151. The arcuate surface 157 is engaged by a mating arcuate surface 159 formed on the inner end of the detent 147. These mating surfaces 157 and 159 facilitate the pivotal movement of the latching member 137.

With the latching member 137 in the elevated position, it can be slid longitudinally rearwardly along the stub shaft 135 until a portion thereof is received within the notch 129. The detent 147 will no longer be restrained by the latching member 137 and accordingly the spring 151 snaps the detent into the locking position shown in FIG. 9. In the locking position, the detent 147 fits snugly between the latching member 137 and the surface 155 of the recess 127. Thus, the detent 147 operates automatically in response to movement of the latching member 137 to the locking position and is operative to prevent inadvertent forward movement of the latching member out of the notch 129. Of course, to move the latching member 137 to the releasing or retracted position, it is only necessary to manually retract the detent 147 against the biasing action of the spring 151. This allows forward longitudinal movement of the latching member 137 and consequent pivotal movement thereof to the retracted position shown in FIG. 7.

Each of the locking assemblies 37 located along the periphery of the airplane 15 has a flattened inboard forward corner 161. The inboard latching members 137, i.e., those mounted along the tracks 33 and 35, may have the usual square corner.

The reason for providing the flattened corner 161 is to allow the rear transverse end of the cargo pallet to flex or bow upwardly under certain load conditions. The corners of the cargo pallet are formed with relatively large radii so that by merely flattening or chamfering the inboard forward corner 161, the rear corners of the pallets are allowed to deflect upwardly past the corner 161 under certain load conditions. The result is that the cargo pallet is deflected under certain load conditions to become slightly U-shaped and this provides substantial resistance to bending about a transverse axis. It is desirable to prevent bending of the cargo pallet about a transverse axis. If such bending is permitted, the transverse ends of the pallet may be moved sufficiently so that the latching members 137 disposed therealong will not be able to restrain the transverse end. However, by permitting some bending about a longitudinal axis, sufficient additional rigidity to bending about a transverse axis is provided so that the pallet will not pull out from beneath the overhanging flanges 141 and 143 of the latching members 137. It has been found unnecessary to similarly chamfer the rearward inboard corner 163.

According to the present invention, the above described objective can be accomplished as illustrated in FIG. 12. FIG. 12 shows a cargo pallet P having a forward transverse end 301, a rearward transverse end 303, rear corners 305, and forward corners 307. As illustrated, the corners 305 and 307 have relatively large radii. The locking assemblies 37, which are illustrated semidiagrammatically in FIG. 12, are disposed along the forward transverse end 301 and along the rearward transverse end 303. Each of the locking assemblies 37 has a latching member 137 for embracing the adjacent end of the pallet P to retain the pallet to the floor structure of the air plane. The latching members 137 on the four outboard locking assemblies 37 illustrated in FIG. 12 each have a flattened inboard forward corner 161.

The cargo pallet P carries cargo 309 which is retained thereon by a plurality of straps 311 which are secured to the pallet adjacent the edges thereof by tiedown fittings 313 and 314. The load applied to the straps 311 by the cargo 309 is transmitted through the pallet P to the floor structure of the aircraft.

When the aircraft is in flight, the cargo 309 is subjected to dynamic loads caused by changes of velocity of the aircraft and because of changes of direction of the aircraft. As indicated hereinabove, such loads are transmitted to the pallet P at least in part by the straps 311. Under certain dynamic load conditions, a central portion of the pallet P tends to bend upwardly about a centrally located transverse axis. If this bending were allowed to occur and it reached sufficient magnitude, the transverse ends 301 and 303 of the pallet P would be withdrawn from beneath the latching members 137 to free the pallet and cargo for movement within the aircraft. It has been found that when such undesirable bending loads are applied to the pallet P, additional bending loads tending to bend the pallet about a longitudinally extending axis are also being applied to the pallet. Accordingly, the present invention provides the flattened forward corners 161 which allow the rearward corners 305 of the pallet P to be deflected upwardly therebeyond as shown in FIG. 12 and not be restrained by the latching members. This causes the pallet to assume an upwardly opening longitudinally extending channel configuration as shown in FIG. 12. This resulting channel configuration provides substantial resistance to bending about a transverse axis and accordingly, such bending is substantially prevented.

It is not necessary that the seat pallets be bendable about a longitudinal axis. Accordingly, the seat pallets are formed with relatively sharp corners so that they will be retained beneath the flange 141 notwithstanding the presence of the flattened forward corner 161.

As the latching member 137 is unitary, it serves the dual function of restraining the confronting transverse edges of an adjacent pair of pallets. As the latching member 137 pivots about a longitudinal axis, a single shaft 135 can be utilized to both pivotally and slidably mount the latching member 137.

FIG. 10 shows how the latching member 137 is operative to restrain movement of the seat pallet 25, it being understood that the latching member would be similarly operative with a cargo pallet such as the cargo pallet 27. The advantage of being able to pivot the latching member 137 is to permit the latter to be retracted to allow rolling movement of the pallets thereover. That is, when the first pallet is rolled along the floor structure 23, all of the latching members 137 are pivoted to their respective retracted positions. When the first pallet is in position at the rear of the airplane 15, the latching members 137 adjacent the forward transversely extending edge of such pallet are rotated to the elevated position and slid rearwardly to the locking position. When in the locking position, the latching member 137 cooperates with the forward transverse edge 163 of the seat pallet 25 shown in FIG. 10.

The seats 26 on the pallets 25 are not shown in FIG. 10 for simplicity. However, a plurality of seat mounting brackets 167 to which the seats 26 may be secured are illustrated. The seat pallet 25 is a broad flat member which is supported by the tracks 33 and 35. The forward transverse edge 163 is of reduced size in cross section and terminates in a transversely extending shoulder 171.

The rearward transverse end of the pallet is similarly constructed and is retained by another one of the latching members 137 unless it is the rearwardmost pallet, in which case the rearward transverse end is retained by the aft locks 81. To prevent rattling of the seat pallet 25, an antirattle device 175 is mounted on the seat pallet 25. The antirattle device includes an extendible shaft 177 mounted in the load supporting member 169 for longitudinal movement relative thereto. The extendible shaft 177 is operated by an overcenter toggle device 179 and a spring 181. The overcenter toggle 179 includes a first link 183 pivotally secured to the extendible shaft 177 and to a second link 185. The second link 185 is pivotally secured to a piston 187 which is biased forwardly by the spring 181. The piston 187 is slidable longitudinally in a cup-shaped member 189 and has a rod 191 extending rearwardly through the cup-shaped member. The first link 183 has an extension therein forming a handle 193 for operating the overcenter toggle device 179. The overcenter toggle device 179 is also provided with the usual stop member (not shown) for preventing movement of the pivot point connecting the links 183 and 185 beyond the overcenter position shown in FIG. 10.

As shown in FIG. 10, the shaft 177 is in the extended position in which it engages the shank portion 139 of the latching member 137. Thus, in the extended position the shaft 177 retains the pallet 25 between the opposed latching members 137. The spring 181 resiliently biases the shaft 177 and the toggle device 179 to the left. The shaft 177 may be moved to a retracted position by raising the handle 193 to move the links 183 and 185 upwardly through the dead center position. No antirattle device need be provided adjacent the other transverse end of the seat pallet.

FIG. 10 also illustrates a tiedown mechanism 197 which holds the pallet 25 firmly against the track 35. Preferably, several of these tiedown mechanisms 197 are utilized for each of the pallets. In the embodiment illustrated, four of the tiedown mechanisms 197 are utilized, there being one of the tiedown mechanisms for each of the blocks 73 shown in FIG. 1.

FIG. 10 shows the portion of the track 35 that has the block 73 mounted therein. As explained hereinabove, the block 73 rigidly supports a pin 77. A handle 199 having a latching portion 201 thereon is pivotally mounted to the seat pallet 25 by a pin 203. As shown in FIG. 10, the latching portion 201 engages beneath the pin 77 in the latching position of the handle 199. The pin 203 fits through a slot 205 which is slightly larger vertically than the pin 203. A leaf spring 207 normally urges the handle portion 199 to the latching position thereof. As shown in FIG. 10, the center or axis of the pin 77 is spaced horizontally slightly from the axis of the pin 203. The engagement between the latching portion 201 and the pin 77 securely retains the pallet 25 against the track 35. It is apparent that the handle 199 can be quickly operated to release the pallet 25 when desired.

A fastener 208, preferably a one-quarter turn fastener, is provided for locking the handle 199 in the down position. Any type of easily operated fastener may be used. In the embodiment illustrated, the fastener 208 includes a rotatable member 208a secured to the pallet and having a locking finger 208b thereon. The handle 199 has an aperture 208c therein for receiving the head of the rotatable member 208 and a latching groove 208d for receiving the finger 208b. The handle 199 is manually movable to the down position in which the head of the member 208a is received in the aperture 208c. The member 208a can then be rotated about 90 degrees to move the finger 208b into the recess 208d to lock the handle 199 in the down position. The handle 199 can be released by counter-rotating the member 208a to remove the finger 208b from the recess 208d.

The present invention is adapted for use with cargo pallets of various designs. Typically, however, a cargo pallet will not have an antirattle device 175 or a hold tiedown mechanism 197 mounted thereon.

A fragment of a typical cargo pallet is illustrated in FIG. 11 in which it can be seen that the cargo pallet includes a broad flat member 209 having a reinforced channel portion 211 embracing the forward transverse end portion thereof. A similar reinforcing member may be utilized on the rearward transverse end portion of the cargo pallet 209, if desired.

FIG. 11 also illustrates a typical section of the ball mat 21. Although the ball mat 21 is illustrated in FIG. 11 as supporting the cargo pallet, the ball mat may be utilized to support various other load supporting members or floor structures.

The ball mat 21 is of conventional design and includes a base member 213 having a plurality of balls 215 mounted for rotation therein. The balls 215 are freely rotatably mounted so as to serve as bearing members for supporting a load thereon. Some of the balls 215 are suitably supported in cups 217 which are biased upwardly by springs 219. In loading the pallets onto the airplane 15, the pallets are inserted through the door opening 17 onto the ball mats 21. The ball mats 21, being freely rotatable, permit low friction movement of the pallet therealong onto the tracks 33 and 35.

FIG. 11 also illustrates a portion of another type of locking assembly 221. The locking assembly 221 is identical to the locking assembly 37 except that the latching member 223 thereof has only a single flange 225 which overhangs the forward transverse edge of the pallet or other member which is supported on the ball mat 21. As the ball mat is in the forwardmost cargo or passenger hauling section of the airplane 15, there is no need that the latching member 221 be T-shaped as is the latching member 137.

In utilizing the present invention, the pallet supporting structure 23, which includes the tracks 33 and 35 and the various assemblies for supporting and locking the various pallets in position, is detachably mounted in the airplane 15 which has a conventional floor structure of the type normally found in passenger aircraft. When it is desired to load pallets or other containerized loads into the airplane, the pallets having been preloaded are first inserted through the door opening 17 and placed on the ball mat 21. The pallet is then moved rearwardly as permitted by the balls 215 of the ball mat 21 onto the tracks 33 and 35. When the pallet is on the tracks 33 and 35, it is supported by the rollers 55, 57, and the rollers 113 of the side roller assemblies 99. These rollers are operative to permit low friction movement of the pallet rearwardly in the airplane 15. The first pallet to be loaded is moved all the way to the rear of the airplane 15 until the rearward transverse end 79 fits within the aft locks 81 as shown in FIGS. 1 and 4. The latching members 137 of the locking assemblies 37 which are disposed along the forward transverse end of the rearward pallet are then raised from their retracted position to their locking position. This pallet is then firmly restrained against movement in all directions. In the event that the pallet inserted is a cargo pallet, it will usually not be necessary to otherwise lock the pallet to the airplane. In the event, however, that this is a seat pallet, the handle 199 of the four tiedown mechanisms 197 are moved to the latching position in which the latching portion 201 lockingly engages the pin 77 as shown in FIG. 10. Similarly, the antirattle device 175 is operated by the overcenter toggle device 179 to cause extension of the shaft 177 into engagement with the shank portion 139 of the adjacent latching member 137.

A second pallet may then be similarly loaded into the airplane and moved rearwardly therein into engagement with the rearwardmost group of latching members 137. The procedure outlined above is then repeated to firmly secure the second pallet in position.

The above-described procedure can be carried out very rapidly to permit rapid changeover of an airplane from cargo to passenger service and vice versa. The changeover requires about 20 minutes for a typical airplane. Similarly, palletized or containerized loads are quickly and easily loaded and unloaded from the airplane. Palletizing of the seats 26 permits simultaneous installation and removal of a plurality of seats. The seat pallets are firmly held in place by the tiedown mechanisms 197 and the antirattle device 175 prevents vibration of the seat pallet and the resulting annoying sound. An airplane which is equipped with the present invention can also be used for combination cargo and passenger service. All of the pallets are very adequately supported and damage thereto is precluded by the rocking capability of the tracks 33 and 35. The speed with which the pallets may be locked into place is substantially increased by use of the unitary latching members 139 which can be quickly moved between the retracted and locking positions thereof.

Although exemplary embodiments of the invention have been shown and described, many changes, modifications and substitutions may be made by one having ordinary skill in the art without necessarily departing from the spirit and scope of this invention.

What is claimed is:
1. In a system for securing a load within a vehicle having a supporting floor structure, the combination of:
   a load supporting member;
   track means extendible along the floor structure of the vehicle and supportable thereby for supporting the load supporting member as the latter are moved into the vehicle along the floor structure thereof, said track means including a longitudinal member and a pin extending generally transversely thereof; and handle means having a latching portion, said handle means being pivotally mounted on said load supporting member and pivotable between a locking position in which said locking portion lockingly engages said pin to secure the load supporting member to said track means and a releasing position in which said latching portion is out of locking engagement with said pin whereby said latching portion no longer restrains relative movement between said load supporting member and said track means.

2. A combination as defined in claim 1, including means for biasing said handle member toward said locking position thereof.

3. A combination as defined in claim 1 including first and second abutment means positioned closely adjacent the opposite ends of said load supporting member and rigidly secured to the vehicle, an extendible member mounted on said load supporting member for longitudinal movement relative thereto beyond one end of the load supporting member, and toggle lever means for urging said extendible member between an extended position in which it engages one of said abutment means and a retracted position in which said extendible member is withdrawn from said one abutment means.

4. In a system for rapid installation and removal of first and second adjacent pallets from a vehicle having a supporting floor structure wherein the pallets have adjacent edges and remote edges, the combination of:

track means extendible along the floor structure of the vehicle and supportable thereby for supporting the pallets as the latter are moved into the vehicle along the floor structure thereof;

a locking assembly;

means for mounting the locking assembly intermediate the pallets and adjacent the adjacent edges thereof;

releasable holding means for restraining the first and second pallets along the remote edges thereof; and said locking assembly including a unitary edge restraining member for restraining the adjacent edges of the first and second pallets against movement toward each other, said edge restraining member being movable between an elevated position in which said edge restraining member restrains the adjacent edges of the first and second pallets and a depressed position in which the unitary edge restraining member lies beneath the pallets and the adjacent edges of the first and second pallets are unrestrained thereby, whereby the pallets can be readily moved over the restraining member without interference therefrom.

5. In a shock absorbing load supporting device for use in a vehicle having a pair of spaced abutments secured to the vehicle and a floor structure, the combination of:

a load supporting member positionable between the abutments in engagement with one of the abutments and supportable by the floor structure of the vehicle;

an extendible member;

means for mounting said extendible member on said load supporting member for movement toward and away from the other of said abutments;

biasing means for urging said extendible member outwardly into tight engagement with said other abutment whereby said extendible member resiliently retains said load supporting member between the abutments; and toggle lever means for selectively allowing said biasing means to act on said extendible member to cause the retention of said load supporting member and for preventing said biasing means from causing said extendible member from tightly engaging said other abutment.

6. In a system for rapid installation and removal of a pallet from a vehicle having a supporting floor structure, the combination of:

a pallet having first and second generally opposed edges;

track means extendible along the floor structure of the vehicle and supportably thereby for supporting the pallet as the latter is moved along the floor structure of the vehicle;

a locking assembly secured to the supporting floor structure, said looking assembly including abutment means for preventing said second edge of said pallet from moving therebeyond in one direction, said abutment means being movable between a restraining position in which said abutment means prevents said second edge of said pallet from moving therebeyond in said one direction and a releasing position in which said second edge of said pallet is unrestrained by said abutment means;

holding means for restraining said first edge of said pallet against movement therebeyond in a direction opposite to said one direction;

extendible means secured to said pallet and extendible into engagement with one of the abutment means and said holding means to securely hold said pallet between said abutment means and said holding means; and said track means includes a first latching member beneath said pallet and a movable latching member mounted for movement on said pallet, said movable latching member being interlockingly engageable with said first latching member to lock the pallet to said track means.

7. In a locking assembly for securing a load supporting member in a vehicle wherein the vehicle has floor structure for supporting the load supporting member, the combination of:

a body member supportable by the floor structure;

a latching member;

means for pivotally mounting said latching member to said body member for movement about a pivotal axis which extends generally longitudinally of the vehicle, said latching member being pivotable between an elevated position in which said latching member extends upwardly beyond said body member and at least partially into the plane of the load supporting member and a retracted position in which said latching member lies below the load supporting member;

means for mounting said latching member for longitudinal movement relative to the body member when said latching member is in said elevated position to a locking position in which said latching member is engageable with the load supporting member to restrain movement thereof; and means for retaining said latching member in said locking position.

8. In a shock absorbing load supporting device positionable between first and second spaced abutments on a floor structure for a vehicle, the combination of:

a broad load supporting member having generally opposite edges and a broad, substantially flat, load supporting face, said member being supportable on the floor structure between said abutments with said edges confronting and lying closely adjacent said abutments, respectively, one of said edges being engageable with the first abutment;

an extendible member;

means for mounting said extendible member on said load supporting member adjacent said second edge of said load supporting member for movement toward and away from said second edge, said extendible member having an end face which is movable outwardly with said extendible member to a position beyond an adjacent portion of said second edge and into engagement with the other of the abutments; and biasing means for urging said extendible member outwardly toward said position whereby said extendible member can resiliently retain said load supporting member between the abutments.

9. A combination as defined in claim 8 including tiedown means on said load supporting member intermediate said edges for retaining the load supporting member against substantial upward movement relative to the floor structure.

10. In a locking assembly for restraining a load supporting member against substantial upward movement, the combination of:

a body member;

a latching member including a shank portion and a flange portion;

means for pivotally mounting said latching member at said shank portion thereof to said body member for movement about a pivotal axis, said latching member being pivotable about said axis between an elevated position in which said flange portion of said latching member lies above said body member and a retracted position in which said latching member lies below the position it assumes in the elevated position;

means for mounting said latching member for movement in one direction along said pivotal axis relative to said body member to a locking position in which said flange portion of said latching member can overhang a portion of the load supporting member and retain same against substantial upward movement; and means responsive to movement of said latching member in said one direction along said pivotal axis for retaining said latching member in said locking position.

11. A combination as defined in claim 10 wherein said body member has a recess therein and said latching member is receivable therein when said latching member is in the retracted position thereof.

12. A combination as defined in claim 7 wherein said means for pivotally mounting includes a shaft secured to said body member and extending generally longitudinally of the vehicle, said latching member being mounted on said shaft for pivotal movement about said pivotal axis and for longitudinal movement therealong toward said locking position.

13. A combination as defined in claim 7 wherein said means for retaining includes a notch formed in said body member, at least a portion of said latching member being receivable in said notch when said latching member is in said locking position whereby said notch prevents said latching member from pivoting to said retracted position.

14. In a load supporting system for a vehicle wherein the load is supported on a relatively broad, flat member, thereby subjecting the member to deflection, the combination of:

a floor structure in the vehicle;

a plurality of elongated tracks extending side by side along the floor structure of the vehicle in the same general direction, each of said tracks having a bearing portion for supporting the broad, flat member thereon with the member resting on the bearing portions of at least two of said tracks; and means for mounting at least one of said tracks on said floor structure to permit slight rocking movement of said one track and the bearing portion thereof about an axis extending generally longitudinally of said one track whereby the member is supported across substantially the full width of the track irrespective of any deflection of the member about a longitudinally extending axis.

15. A combination as defined in claim 14 wherein said one track has a lower face and said floor structure has an upper face beneath said lower face, and said means for mounting includes interengaging means on said faces of said one track and said floor structure, said lower face tapering upwardly away from said upper face as said faces extend outwardly transversely of said interengaging means to allow said rocking movement.

16. In a system for permitting rapid installation and removal of passenger seats in an airplane, the combination of:

a floor structure having opposed longitudinal edges;

a plurality of elongated tracks extending longitudinally in side-by-side relationship along the floor structure of the airplane, each of said tracks including a longitudinal member, a plurality of rollers rotatably mounted on said longitudinal member about a generally transverse axis, and at least one pin secured to said longitudinal member and extending generally transversely thereof, said rollers having bearing portions thereon;

means for detachably mounting at least one of said tracks on said floor to permit slight rocking movement of said one track and the bearing portion thereof about an axis extending generally longitudinally of said one track;

a seat pallet having an upper face and supported on the bearing portions of said rollers above said pin, said seat pallet having generally opposed transverse ends;

a plurality of passenger seats mounted on said seat pallet and extending upwardly from said upper face thereof;

a plurality of locking assemblies disposed along said transverse ends of said seat pallet, each of said locking assemblies including a body member secured to the floor, a latching member, means for pivotally mounting the latching member on the body member for movement between an elevated locking position in which said latching member is engageable with said pallet to restrain movement thereof and a retracted position in which said latching member lies beneath said pallet, and means for retaining said latching member in said locking position whereby said latching members embrace said transverse ends of said seat pallet in said locking position to restrain movement thereof, the locking assemblies disposed along one of said transverse edges of said pallet retaining a central portion of said one transverse edge against substantial upward movement relative to the floor structure;

handle means having a latching portion, said handle means being pivotally mounted on said seat pallet and pivotable between a first position in which said locking portion lockingly engages said pin to secure the pallet to said tracks and a second position in which said locking portion is out of locking engagement with said pin;

an antirattle device including an extendible member mounted on said seat pallet for movement longitudinally thereof toward and away from one of said latching members, and toggle lever means for selectively causing extension of said one latching member to resiliently retain said seat pallet between the various latching members and for withdrawing said extendible member from said one latching member; and a plurality of side guide assemblies disposed in longitudinally spaced relationship along one of said longitudinal edges of said floor structure, each of said guide assemblies including a body member and a pallet supporting roller rotatably mounted on said body member, and means for detachably securing each of said guide assemblies to said floor structure.

17. In a cargo system for use in a vehicle subject to dynamic forces, the combination of:

a pallet having front and rear transverse edges and longitudinal edges with the longitudinal edges meeting one of the transverse edges at first and second corners, respectively;

a pallet supporting structure mountable on the floor structure of the vehicle for supporting the pallet;

first locking means connectible to one of said structures adjacent the other of said transverse edges of said pallet and engageable therewith to retain said other transverse edge against substantial upward movement relative to the floor structure;

second locking means connectible to one of said structures adjacent said one transverse edge of said pallet for retaining a central portion of said one transverse edge against substantial upward movement relative to the floor structure; and the outer portions of said one transverse edge extending from said central portion to said corners and substantial lengths of said longitudinal edges beginning at said corners being free to move upwardly away from the pallet supporting structure, said outer portions being of substantial length whereby said pallet can deflect under the influence of the dynamic forces and assume the configuration of a longitudinal extending channel having substantial resistance to bending about a transverse axis.

18. A combination as defined in claim 17 wherein said second locking means includes at least one flange member for overhanging a region of the central portion of said one transverse edge to retain the latter against substantial upward movement relative to the floor structure and a pair of outboard flange members positioned respectively along the outer portions of said one transverse edge adjacent said corners of the pallet, each of said outboard flanges having a portion extending away from said one transverse edge to retain an adjacent pallet and being incapable of retaining said outer portions against substantial upward movement relative to the floor structure.

19. In a load supporting side guide assembly for supporting and guiding a load carrying member and wherein said assembly is attachable to the floor structure of a vehicle, the combination of:

a body member having a roller mounting section and a lateral guide section extending upwardly from said mounting section, said lateral guide section having a guide surface;

a load supporting roller;

means for rotatably mounting said roller on said roller mounting section for rotation about an axis extending generally transversely of said lateral guide section, at least the upper surface of said roller being exposed, said guide surface of said lateral guide section being located on one side of said roller and generally confronting said one side of said roller;

a mounting member on said mounting section of said body member, said mounting member projecting downwardly therefrom for detachably securing said body member to the floor structure; and said body member also having a supporting leg spaced from said mounting member and located on the same side of said roller as said lateral guide section, said supporting leg being engagement with the floor structure to support the assembly.

20. A combination as defined in claim 19 wherein said body member is of integral construction and said guide surface of said lateral guide section lies intermediate said one side of said roller and the outer end of said supporting leg.

21. In a system mountable on the floor of a vehicle for supporting a load carrying member, the combination of:

at least one track extending longitudinally of the floor of the vehicle, said track including an elongated member, a plurality of rollers, and means for mounting said rollers on said elongated member in longitudinally spaced relationship for rotation, respectively, about axes extending generally transverse to the floor structure, at least the upper portions of said rollers being engageable with the load carrying member to support the latter for low friction movement thereover;

a plurality of side guide assemblies disposed in longitudinally spaced relationship along at least one of the longitudinal edge portions of the floor of the vehicle;

each of said side guide assemblies including a body member and low friction pallet supporting means rotatably mounted on said body member, the adjacent body members of each of said side guide assemblies being substantially spaced longitudinally from each other to reduce the weight of the system, each of said body members being substantially shorter longitudinally of said track; and means at least partially on said body member for detachably securing each of said side guide assemblies to selected locations along the longitudinal edge portions of the floor structure.

22. A combination as defined in claim 21 wherein said low friction pallet supporting means includes a roller and each of said body members defines an upwardly extending laterally guide surface on the outboard side of said roller and generally confronting said roller.

23. A combination as defined in claim 22 wherein said body member has a supporting leg engageable with the floor structure on the outboard end of said roller and said lateral guide surface is located intermediate said roller and the outboard end of said supporting leg.

24. In a quick change system for use in a vehicle, the combination of:

a supporting floor structure including a longitudinally extending seat rail having an upwardly opening longitudinally extending channel;

a longitudinally extending track above said seat rail, said track including an upwardly opening, longitudinally extending channel portion with a lower face and first and second upwardly extending spaced flanges and means for detachably securing said channel portion to said seat rail with said lower face confronting said seat rail;

a plurality of shafts mounted on said channel portion in longitudinally spaced relationship, each of said shafts extending transversely through said spaced flanges; and a plurality of pairs of rollers mounted on said shafts respectively, said rollers being mounted externally of said channel portion, the rollers of each of said pair of rollers being mounted on opposite sides of said channel portion.

25. In a track for use in a load supporting system for a vehicle wherein the track is attachable to a mounting member having an upper face, the combination of:

an elongated support member, said support member including a web and at least one flange projecting upwardly therefrom, said web having a lower surface;

said elongated support member including a plurality of mounting sections projecting from said web for mounting the support member on the mounting member with said lower surface generally confronting the upper face;

a plurality of rollers;

means for mounting at least some of said rollers in longitudinally spaced relationship on the flange of said support member, each of said rollers being rotatably mounted for supporting a load carrying member; and the lower surface of said web extending downwardly slightly as it extends inwardly from the outer edges thereof to thereby provide a clearance space between the outer portions of said surfaces whereby the support member can rock slightly about a generally longitudinally extending axis.

26. In a system for rapid installation and removal of a load supporting member from a vehicle having a floor, the combination of:
 first and second seat rails mounted on the floor of the vehicle in spaced, generally parallel relationship, said seat rails extending generally longitudinally along the floor of the vehicle, each of said seat rails having an upper surface;
 first and second tracks extending along said first and second seat rails, respectively;
 each of said tracks including means for detachably mounting said track on one of the seat rails and low friction means for supporting the load supporting member and for permitting low friction movement of the load supporting member thereover;
 said first and second tracks being detachably mounted on said first and second seat rails, respectively, and extending generally longitudinally therealong in spaced, generally parallel relationship;
 each of said tracks defining at least one region at which at least a portion of the upper surface of the associated seat rail is exposed, said regions being generally transversely aligned;
 first and second locking assemblies, each of said locking assemblies including means for detachably mounting said locking assembly to a seat rail, said first and second locking assemblies being detachably mounted directly on said first and second seat rails, respectively, at said regions thereof; and
 each of said locking assemblies including edge restraining means for substantially restraining an adjacent edge of the load supporting member against movement in one longitudinal direction and means for mounting said edge restraining means for movement between an elevated position in which said edge restraining means restrains the adjacent edge of the adjacent load supporting member and a depressed position in which the edge restraining means lies beneath the adjacent load supporting member whereby the load supporting member can be readily moved over the edge restraining means without interference therefrom.

27. A combination as defined in claim 26 wherein each of said seat rails includes an elongated channel defining an upward opening, longitudinally extending groove and flange means for at least partially closing the upper end of said groove to define, respectively, relatively large and relatively small openings into said groove and said means for mounting said locking assembly includes lug means extendible through said large opening and retainable by said flange means.

28. A combination as defined in claim 27 including third and fourth locking assemblies directly detachably mounted to said first and second seat rails in generally transverse alignment, the third and fourth locking assemblies being spaced longitudinally from the first and second locking assemblies, respectively, by one of the associated track sections, such spacing being approximately equal to the length of the load supporting member whereby said locking assemblies can restrain the load supporting member against longitudinal movement.

29. In a system for rapid installation and removal of a load supporting member from a vehicle having a floor, the combination of:
 first and second seat rails mounted on the floor of the vehicle in spaced, generally parallel relationship, said seat rails extending generally longitudinally along the floor;
 a plurality of track sections, each of said track sections including means for detachably mounting said track section on one of the seat rails and low friction means for supporting the load supporting member and for permitting low friction movement of the load supporting member thereover;
 at least two of said track sections being detachably mounted on said first seat rail in generally aligned, end-to-end relationship with the confronting ends thereof being spaced to define a gap above a region of the first seat rail;
 at least two others of said track sections being detachably mounted on said second seat rail in generally aligned end-to-end relationship with the confronting ends thereof being spaced to define a gap above a region of the second seat rail;
 said track sections on said first seat rail being parallel to said track sections on said second seat rail and said gaps on said seat rails being generally transversely aligned;
 first and second locking assemblies, each of said locking assemblies including means for detachably mounting said locking assembly to a seat rail, said first and second locking assemblies being detachably mounted in said gaps directly on said first and second seat rails, respectively; and
 each of said locking assemblies including edge restraining means for substantially restraining an edge portion of the load supporting member against movement in one longitudinal direction and means for mounting said edge restraining means for movement between an elevated position in which said edge restraining means can restrain the adjacent edge of the load supporting member and a depressed position in which the edge restraining means lies beneath the load supporting member whereby the load supporting member can be readily moved over the edge restraining means without interference therefrom to thereby facilitate installation and removal of the load supporting member.

30. In a system for rapid installation and removal of first and second adjacent pallets from a vehicle having a supporting floor structure wherein the pallets have adjacent edges and remote edges, the combination of:
 track means extendible along the floor structure of the vehicle and supportable thereby for supporting the pallets as the latter are moved into the vehicle along the floor structure thereof;
 a locking assembly;
 means for mounting the locking assembly intermediate the pallets and adjacent the adjacent edges thereof;
 releasable holding means for restraining the first and second pallets along the remote edges thereof;
 said locking assembly including a unitary edge restraining member for restraining the adjacent edges of the first and second pallets against movement toward each other, said edge retaining member being movable between an elevated position in which said edge restraining member restrains the adjacent edges of the first and second pallets and a depressed position in which the unitary edge restraining member lies beneath the pallets and the adjacent edges of the first and second pallets are unrestrained thereby, whereby the pallets can be readily moved over the restraining member without interference therefrom; and
 said unitary edge restraining member being pivotable between said positions thereof about a pivotal axis and said pivotal axis being generally parallel to the longitudinal axis of said track means.

31. In a system for rapid installation and removal of a pallet from a vehicle having a supporting floor structure, the combination of:
 a pallet having first and second generally opposed edges;
 track means extendible along the floor structure of the vehicle and supportable thereby for supporting the pallet as the latter is moved along the floor structure of the vehicle;

a locking assembly;

means for mounting said locking assembly in close proximity to said floor structure so that the pallet can be moved adjacent said locking assembly, said locking assembly including abutment means for preventing said second edge of said pallet from moving therebeyond in one direction, said abutment means being movable between a restraining position in which said abutment means prevents said second edge of said pallet from moving therebeyond in said one direction and a releasing position in which said second edge of said pallet is unrestrained by said abutment means;

holding means for restraining said first edge of said pallet against movement therebeyond in a direction opposite to said one direction;

extendible means movably mounted on said pallet and movable to an extended position in which said extendible means is engageable with one of said abutment means and said holding means to securely hold said pallet between said abutment means and said holding means;

operator means mounted on said pallet for moving said extendible means to said extended position; and said extendible means including a first member engageable with said one means and shock absorbing means for resiliently urging said first member toward said extended position.

32. A combination as defined in claim 8 wherein said load supporting member includes a seat pallet and said seat pallet has a plurality of passenger seats secured to said face thereof.

33. A combination as defined in claim 10 wherein said flange portion of said latching member has a chamfered forward inboard corner.

References Cited

UNITED STATES PATENTS

| | | | |
|---|---|---|---|
| 3,178,043 | 4/1965 | Easterwood | 214—84 |
| 2,605,064 | 7/1952 | Davis | 244—118 |
| 3,142,461 | 7/1964 | Naylor | 244—137 |
| 3,251,489 | 5/1966 | Davidson | 244—137 X |
| 3,259,252 | 7/1966 | Peterson | 105—392.5 X |
| 3,262,588 | 7/1966 | Davidson | 244—137 X |
| 3,294,034 | 12/1966 | Bodenheimer et al. | 244—118 X |
| 3,357,372 | 12/1967 | Bader | 244—137 X |

MILTON BUCHLER, Primary Examiner

T. W. BUCKMAN, Assistant Examiner

U.S. Cl. X.R.

105—392; 214—84